United States Patent
Twyford

(10) Patent No.: US 7,093,545 B2
(45) Date of Patent: Aug. 22, 2006

(54) DATA DEVICE MOUNTABLE ON THE STEERING WHEEL OF A VEHICLE

(75) Inventor: Robert H. Twyford, Great Falls, VA (US)

(73) Assignee: Datalux Corporation, Winchester, VA (US)

( * ) Notice: Subject to any disclaimer, the term of this patent is extended or adjusted under 35 U.S.C. 154(b) by 378 days.

(21) Appl. No.: 10/681,531

(22) Filed: Oct. 8, 2003

(65) Prior Publication Data

US 2005/0076815 A1    Apr. 14, 2005

(51) Int. Cl.
*A47B 23/00*    (2006.01)
(52) U.S. Cl. ..................................... 108/44
(58) Field of Classification Search ............. 108/44, 108/45, 43, 152; 224/276, 400
See application file for complete search history.

(56) References Cited

U.S. PATENT DOCUMENTS

| | | | | |
|---|---|---|---|---|
| 2,211,962 A | * | 8/1940 | Morris | 108/44 |
| 2,299,025 A | * | 10/1942 | McGinley | 108/44 |
| 2,746,821 A | * | 5/1956 | Schroeder | 108/44 |
| D257,589 S | | 12/1980 | Shaffert | |
| D292,445 S | | 10/1987 | Judge | |
| 4,749,161 A | | 6/1988 | Falcone | |
| 4,805,867 A | | 2/1989 | McCallister | |
| 4,890,559 A | * | 1/1990 | Martin | 108/44 |
| 4,915,035 A | | 4/1990 | Clark et al. | |
| 4,974,805 A | | 12/1990 | Clark | |
| 5,060,581 A | | 10/1991 | Malinski | |
| 5,177,665 A | | 1/1993 | Frank et al. | |
| D358,612 S | | 5/1995 | Smith | |
| 5,413,035 A | | 5/1995 | Fernandez | |
| 5,487,521 A | | 1/1996 | Callahan | |
| 5,673,628 A | * | 10/1997 | Boos | 108/44 |
| 5,749,305 A | | 5/1998 | Jacovelli | |
| 6,279,800 B1 | * | 8/2001 | Lee | 108/44 |
| 6,386,413 B1 | | 5/2002 | Twyford | |
| 6,494,148 B1 | * | 12/2002 | Mullaney | 108/44 |
| 6,662,983 B1 | * | 12/2003 | Lane et al. | 108/44 |
| 6,830,292 B1 | * | 12/2004 | Yoda | 108/44 |

FOREIGN PATENT DOCUMENTS

GB    2150882 A  *  7/1985

* cited by examiner

*Primary Examiner*—Jose V. Chen
(74) *Attorney, Agent, or Firm*—Joseph G Seeber

(57) ABSTRACT

The present disclosure generally relates to a data device which is mountable on the steering wheel of a vehicle. The device for mounting the data device on the steering wheel of the vehicle comprises a T-shaped arrangement including a member or members extending perpendicularly from the periphery of a frame of the data device, and connected to a further member disposed horizontally and in parallel with the periphery of the frame, that is, parallel to the width of the data device. As a result, the occupant of a vehicle is provided with the capability of quickly mounting the data device on, and quickly dismounting the data device from, the steering wheel of the vehicle. The data device is mounted on the steering wheel in such a manner as to provide for stability of the data device during its use. Preferably, the members extending perpendicularly from the periphery of the frame are connected by hinges to the periphery of the frame so that the device for mounting the data device on the steering wheel of the vehicle can be folded back against the rear or underside of the data device when the data device is not in use.

18 Claims, 2 Drawing Sheets

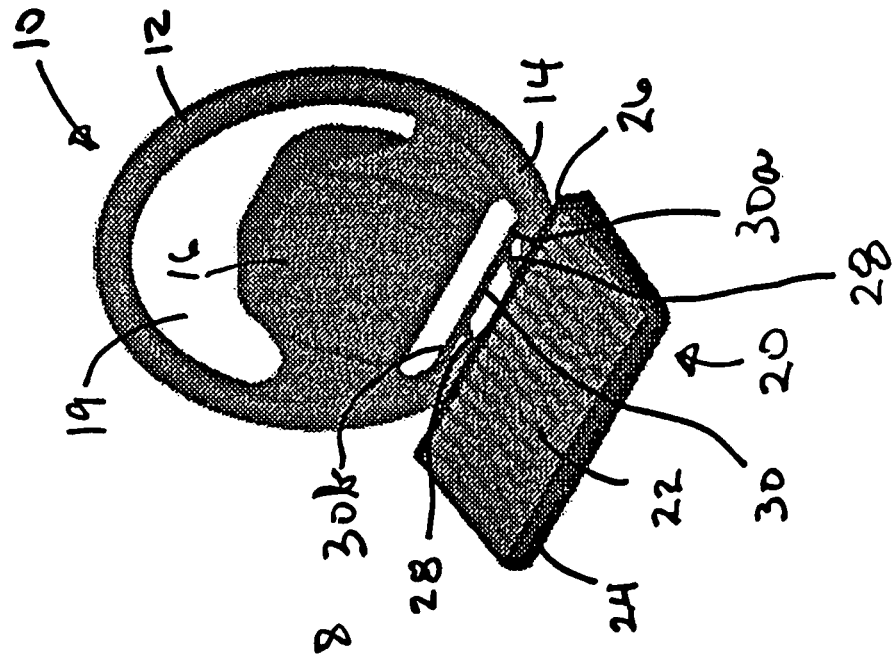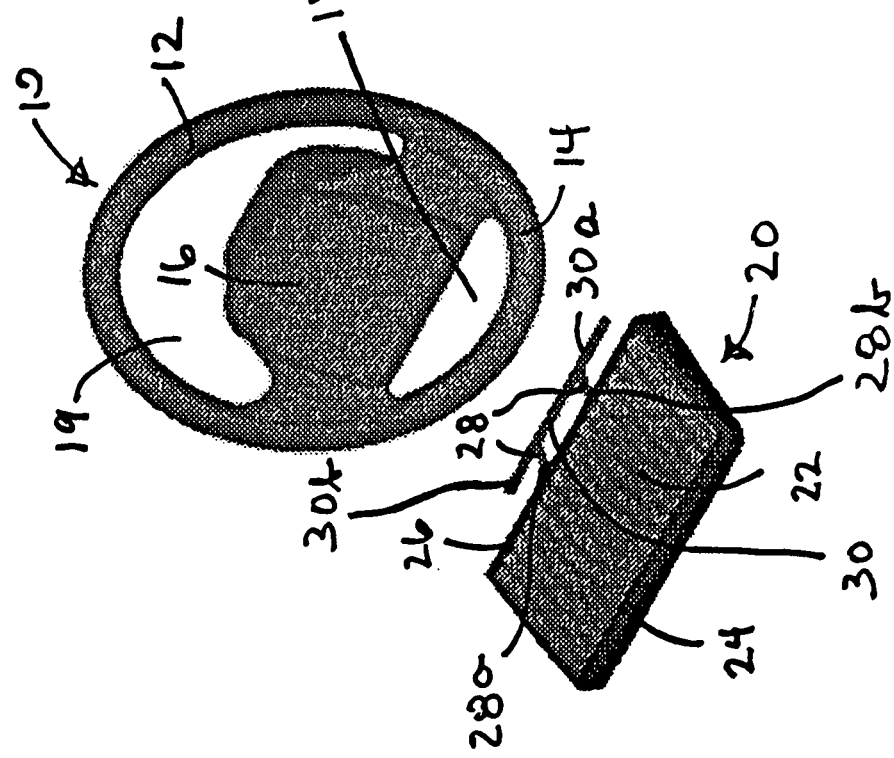

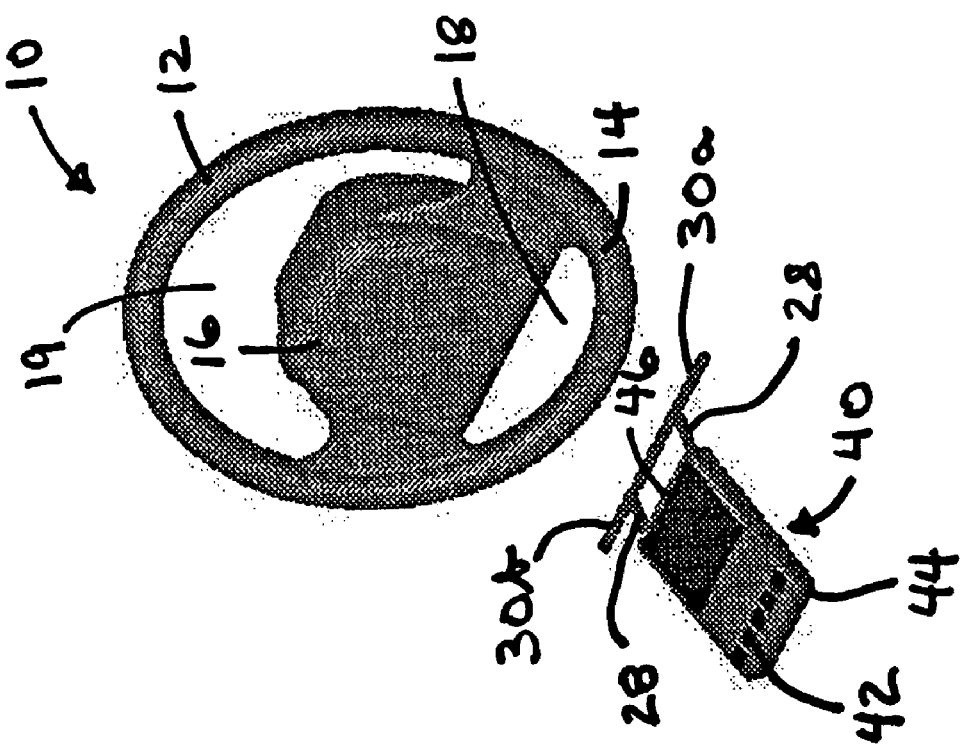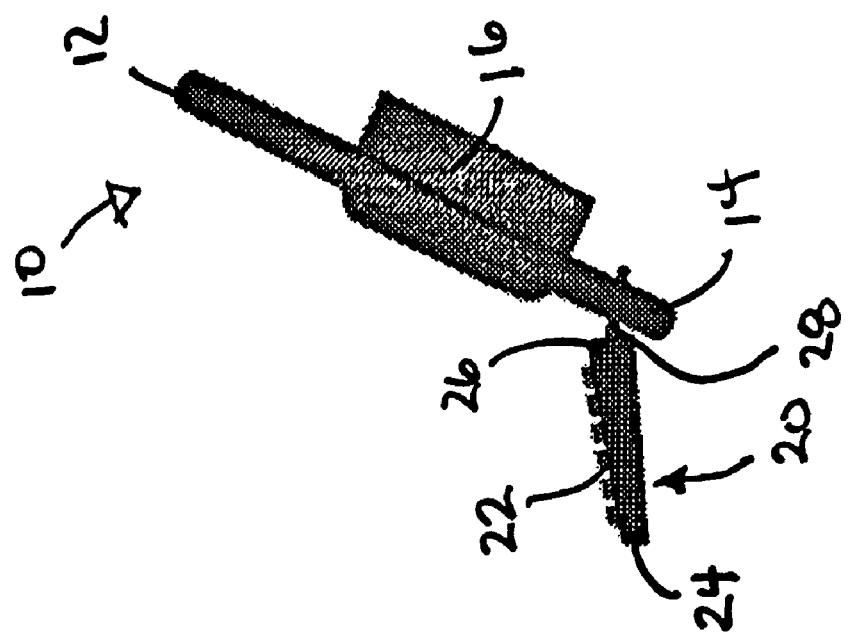

DATA DEVICE MOUNTABLE ON THE STEERING WHEEL OF A VEHICLE

TECHNICAL FIELD

The present invention generally relates to a data device which is mountable on the steering wheel of a vehicle. As a result of the present invention, the occupant(s) of a vehicle are provided with the capabilities of quickly mounting the data device on the steering wheel of the vehicle in such a manner as to provide for stability of the data device during its use, and of quickly dismounting the data device after use.

BACKGROUND ART

The use of a computer system, including data devices such as a keyboard and a computer/display unit, in a vehicle is becoming more prevalent. For example, such computer systems are employed in police vehicles or emergency vehicles. An example of such a vehicle mounted computer system is disclosed in U.S. Pat. No. 6,386,413 of Twyford, which is assigned to the assignee of the present invention. In such arrangements, the driver of the vehicle will sometimes find it more convenient to have the data device positioned directly in front of him/her.

Various arrangements have been developed for the purpose of mounting a tray or other support on the steering wheel of a vehicle. Examples of such arrangements are disclosed in the following U.S. Pat. Nos. 4,749, 161; 4,805, 867; 4,915,035; 4,974,805; 5,060,581; 5,177,665; 5,413, 035; 5,487,521; 5,749,305; Des. 257,589; Des. 292,445; and Des. 358,612.

However, such arrangements have disadvantages when used for the mounting of a data device on the steering wheel of a vehicle. Specifically, such devices are typically overly complicated to install in that they require multiple steps in order to secure the tray or support to the steering wheel. In addition, once the tray or support is mounted on the steering wheel, the data device is then simply placed on the tray. As a result, the data device can easily slide around on the tray during use, resulting in an increased number of typing mistakes which occur during data entry. Of course, one could provide some means for fixing the data device to the tray, but that would overly complicate the installation process, and make dismounting of the data device and/or tray too time-consuming. Many users do not have the time for lengthy installation of the data device on, or lengthy dismounting of the data device from, the steering wheel of the vehicle.

Therefore, there has been a need in the prior art for development of a data device which is quickly and easily mountable on, and quickly and easily dismountable from, the steering wheel of a vehicle, and which, once mounted on the steering wheel, will provide the user with a stable device which can be used with minimal occurrence of mistakes during use.

DISCLOSURE OF INVENTION

The present invention generally relates to a data device which is mountable on the steering wheel of a vehicle. Specifically, the invention relates to a data device which can be quickly and securely mounted on the steering wheel of the vehicle so as to provide for stability of the data device during its use, and which can be quickly dismounted from the steering wheel after use.

More specifically, the present invention comprises a data device (such as a keyboard) having a frame on which a work surface (such as an array of keys) is disposed, the frame having a periphery on which a device for quickly and securely mounting the data device on the steering wheel is provided. In accordance with the invention, the device for securely mounting the data device on the steering wheel of the vehicle comprises a T-shaped arrangement having a member or members extending perpendicularly from the periphery of the frame, and connected to a further member disposed horizontally and in parallel with the periphery of the frame, that is, parallel to the width of the data device. Preferably, the T-shaped arrangement has at least two members connected to the further member, and connected by hinges to the periphery of the frame so that the device for mounting the data device on the steering wheel of the vehicle can be folded back against the rear or underside of the data device when the data device is not in use. It should be noted that a keyboard is just one example of the type of data device to which the present invention is applicable. Other examples include (but are not limited to) other types of data entry devices, data output devices, computing devices, processors, and display units or devices.

Therefore, it is an object of the present invention to provide a data device which is mountable on the steering wheel of a vehicle.

It is an additional object of the present invention to provide a data device which can be quickly and securely mounted on the steering wheel of the vehicle so as to provide for stability of the data device during its use, and which can be quickly and easily dismounted from the steering wheel after use.

It is an additional object of the present invention to provide a data device which is mountable on the steering wheel of a vehicle, wherein the device for mounting the data device on the steering wheel comprises a T-shaped arrangement including a member or members extending perpendicularly from the periphery of a frame of the data device, and connected to a further member disposed horizontally and in parallel with the periphery of the frame, that is, parallel to the width of the data device.

It is an additional object of the present invention to provide a data device which is mountable on the steering wheel of a vehicle, wherein the device for mounting the data device on the steering wheel of the vehicle can be folded back against the rear or underside of the data device when the data device is not in use.

It is an additional object of the present invention to provide a data device which is mountable on the steering wheel of a vehicle, wherein the device for mounting the data device on the steering wheel of the vehicle is connected by hinges to the frame of the data device so that the mounting device can be folded back against the rear or underside of the data device when the data device is not in use.

The above and other objects, and the nature of the invention, will be more clearly understood by reference to the following detailed description, the drawings and the appended claims.

BRIEF DESCRIPTION OF DRAWINGS

FIG. 1 is perspective view of a keyboard prior to being mounted on the steering wheel of a vehicle in accordance with the present invention.

FIG. 2 is a perspective view of the keyboard of FIG. 1 after being mounted on the steering wheel of the vehicle.

FIG. 3 is a side view of the keyboard of FIG. 1 after being mounted on the steering wheel of the vehicle.

FIG. 4 is a perspective view of another type of data device which can be mounted on the steering wheel of a vehicle in accordance with the present invention.

BEST MODE FOR CARRYING OUT THE INVENTION

The invention will now be described in more detail with reference to the various figures of the drawings.

FIG. 1 is perspective view of a keyboard prior to being mounted on the steering wheel of a vehicle in accordance with the present invention.

As seen therein, a steering wheel 10 comprises an upper portion 12 and a lower portion 14 surrounding a center portion 16. A keyboard 20 includes a center portion 22 on which keys are disposed, surrounded by a frame 24 having a forward portion 26 most distant from the user when the keyboard 20 is in use.

As also seen in FIG. 1, in accordance with the invention, at least two members 28 are fixed to the forward portion 26 of the frame 24, and extend forward from the forward portion 26 (away from the user). Preferably, the members 28 are substantially perpendicular to the forward portion 26. Also in accordance with the invention, a further member 30 is fixed to distal ends of the members 28 so as to extend in a direction generally perpendicular to the members 28. Thus, the members 28 and 30 form a T-shaped arrangement. The further member 30 has a length so that it has end portions 30a and 30b which extend to the right and to the left, respectively of the distal ends of the members 28. Furthermore, the member 30 has a length which corresponds to the width of the lower portion 14 of the wheel 10, as will be described in more detail below. Finally, in accordance with another feature of the present invention, the members 28 are fixed to the forward portion 26 of the frame 24 by respective hinges 28a and 28b so that, when the keyboard 20 is not in use, the members 28 and further member 30 can be folded back along the underside of the keyboard 20, thereby facilitating storage of the keyboard 20 when not in use. With respect to the T-shaped arrangement formed by members 28 and 30, as discussed above, it should be noted that such a T-shaped arrangement could be formed by a single member 28 and a member 30 connected perpendicularly to the member 28 without departing from the spirit and scope of the invention.

FIG. 2 is a perspective view of the keyboard of FIG. 1 after being mounted on the steering wheel of the vehicle.

As seen therein, when it is desired to mount the keyboard 20 on the wheel 10, the members 28 and further member 30 are rotated about the hinges 28a and 28b so as to move them from their storage position against the underside of the keyboard 20 to their operational position extending forward from the keyboard 20, as seen in FIGS. 1 and 2. Then, referring to FIG. 2, the user inserts the further member 30 with its end portions 30a and 30b into the open space 18 between the lower portion 14 and the center portion 16 of the steering wheel 10, and then lowers the keyboard 20 so that the end portions 30a and 30b come to rest against the rear surface of the lower portion 14 of the steering wheel 10. In accordance with the invention, the further member 30 has a length which is small enough to pass through an upper portion of the space 18, but which is sufficiently large that the end portions 30a and 30b contact, and come to rest against, the rear surface of the lower portion 14 of the steering wheel 10 when the keyboard 20 is lowered into a "rest position". It should be noted that, in the case where the space 18 between lower portion 14 and center portion 16 of the steering wheel 10 is not large enough to accommodate the further member 30, the user can rotate the steering wheel 10 so that larger space 19 (see FIG. 2) is located at the bottom of the steering wheel 10, thereby providing a space sufficient to accommodate the further member 30.

FIG. 3 is a side view of the keyboard of FIG. 1 after being mounted on the steering wheel of the vehicle.

As seen in FIGS. 2 and 3, in this position, the weight of the keyboard 20 tends to rotate the keyboard 20 in the downward direction so that the end portions 30a and 30b of further member 30 press firmly against the rear surface of the lower portion 14 of the steering wheel 10, thereby providing for a stable mounting and positioning of the keyboard 20 on the steering wheel 10. As a result, the user can use the keyboard 20 for typing and entry of data without fear of the keyboard 20 sliding or moving, as it would were it simply placed on a tray previously mounted on the wheel 10, as in prior art arrangements.

FIG. 4 is a perspective view of another type of data device which can be mounted on the steering wheel of a vehicle in accordance with the present invention.

As seen in FIG. 4, a steering wheel 10 comprises an upper portion 12 and a lower portion 14 surrounding a center portion 16. A data device 40 includes a center portion 42 on which keys or a display, or other implements, are disposed, surrounded by a frame 44 having a forward portion 46 most distant from the user when the data device 40 is in use. As also seen in FIG. 4, in accordance with the invention, at least two members 28 are fixed to the forward portion 46 of the frame 44, and extend forward from the forward portion 46 (away from the user). Preferably, the members 28 are substantially perpendicular to the forward portion 46. Also in accordance with the invention, a further member 30 is fixed to distal ends of the members 28 so as to extend in a direction generally perpendicular to the members 28. Thus, the members 28 and 30 form a T-shaped arrangement. The further member 30 has a length so that it has end portions 30a and 30b which extend to the right and to the left, respectively of the distal ends of the members 28. Furthermore, the member 30 has a length which corresponds to the width of the lower portion 14 of the wheel 10. Finally, in accordance with another feature of the present invention, the members 28 are fixed to the forward portion 26 of the frame 44 by respective hinges 28a and 28b so that, when the data device 40 is not in use, the members 28 and further member 30 can be folded back along the underside of the data device 40, thereby facilitating storage of the data device 40 when not in use. Further details of the mounting of the data device 40 on the steering wheel 10 are set forth above with respect to the keyboard 10, and are not repeated here for the sake of brevity.

As described above, in accordance with the invention, the keyboard 20 or other data device 40 is quickly mounted on the steering wheel 10 of the vehicle. This is due to the fact that, in accordance with the invention, the members 28 and further member 30 are fixed to the keyboard 20 or other data device 40 either during fabrication of the keyboard 20 or other data device 40, or as a modification to the keyboard 20 or other data device 40 after sale to the user. Thus, there is no necessity to spend time mounting a separate tray on the wheel 10 so as to prepare a place for disposition of the keyboard 20 or other data device 40. With respect to the T-shaped arrangement formed by members 28 and 30, as discussed above, it should be noted that such a T-shaped arrangement could be formed by a single member 28 and a member 30 connected perpendicularly to the member 28 without departing from the spirit and scope of the invention.

In addition, in accordance with the invention, the keyboard 20 or other data device 40 is securely mounted on the steering wheel 10 of the vehicle so as to provide for stability of the keyboard 20 or other data device 40 during its use while mounted on the steering wheel 10. This is due to the fact that, once the keyboard 20 or other data device 40 is mounted on the wheel steering 10, the weight of the keyboard 20 or other data device 40 tends to rotate the keyboard 20 or other data device 40 in the downward direction so that the end portions 30a and 30b of further member 30 press firmly against the rear surface of the lower portion 14 of the wheel 10, thereby providing for a stable mounting and positioning of the keyboard 20 or other data device 40 on the steering wheel 10.

In addition, the device for mounting the keyboard 20 or other data device 40 on the steering wheel 10 of the vehicle (that is, the members 28 and further member 30) can be folded back against the rear or underside of the keyboard 20 or other data device 40 when the keyboard 20 or other data device 40 is not in use, thereby facilitating storage of the keyboard 20 or other data device 40 when not in use. As described above, this is due to the fact that, in accordance with the present invention, the members 28 used to mount the keyboard 20 or other data device 40 on the steering wheel 10 of the vehicle are connected by hinges 28a and 28b to the forward portion 26 of the frame 24 of the keyboard 20, or to the forward portion 46 of the frame 42 of the data device 40, so that the members 28 and further member 30 can be folded back into a storage position against the rear or underside of the keyboard 20 or other data device 40 when the keyboard 20 or other data device 40 is not in use, and then rotated forward into an operational position when the keyboard 20 or other data device 40 is to be mounted on the steering wheel 10.

Finally, in accordance with the invention, the keyboard 20 or data device 40 are quickly and easily dismounted from the steering wheel 10 once the keyboard 20 or data device 40 is no longer needed, since no additional device or mechanism (e.g., bolts, screws, etc.) is employed in mounting the keyboard 20 or data device 40 on the steering wheel 10.

While preferred forms and arrangements have been shown in illustrating the invention, it is to be understood that various changes and modifications may be made without departing from the spirit and scope of this disclosure.

The invention claimed is:

1. A data device mountable on a steering wheel of a vehicle, comprising:
   a main portion;
   a frame including a periphery surrounding said main portion, said periphery including a front portion and a rear portion; and
   mounting means disposed on said front portion of said frame for mounting said data device on the steering wheel of the vehicle;
   wherein said mounting means comprises at least two members connected to said periphery of said frame and extending forward from said data device, and a further member connected to forward ends of said at least two members and extending in a direction parallel to a width of said data device, said further member being of such a length as to have end portions which extend to the left and right, respectively, from said at least two members.

2. The data device of claim 1 in combination with the steering wheel, wherein said further member has a length large enough to pass through a center portion of the steering wheel, but small enough that the end portions of said further member contact a rear surface of a lower portion of the steering wheel once said data device is lowered into a rest position.

3. The data device of claim 2 in combination with the steering wheel, said mounting means further comprising hinges, one for each of said at least two members, for connecting said at least two members to said periphery of said frame, whereby said at least two members and said further member can be folded back along an underside of said data device when said data device is not in use.

4. The data device of claim 1, said mounting means further comprising hinges, one for each of said at least two members, for connecting said at least two members to said periphery of said frame, whereby said at least two members and said further member can be folded back along an underside of said data device when said data device is not in use.

5. The data device of claim 1, further comprising hinges for connecting said mounting means to said periphery of said frame, whereby said mounting means can be folded back along an underside of said data device when said data device is not in use.

6. A data device mountable on a steering wheel of a vehicle, comprising:
   a main portion:
   a frame including a periphery surrounding said main portion, said periphery including a front portion and a rear portion; and
   mounting means disposed on said front portion of said frame for mounting said data device on the steering wheel of the vehicle;
   wherein said mounting means comprises a T-shaped member connected to said periphery of said frame and extending forward from said data device, said T-shaped member having a horizontal portion extending in a direction parallel to a width of said data device.

7. The data device of claim 6 in combination with the steering wheel, wherein said horizontal portion has a length large enough to pass through a center portion of the steering wheel, but small enough that ends of said horizontal portion contact a rear surface of a lower portion of the steering wheel once said data device is lowered into a rest position.

8. The data device of claim 7 in combination with the steering wheel, said mounting means further comprising at least one hinge for connecting said T-shaped member to said periphery of said frame, whereby said T-shaped member and said horizontal portion can be folded back along an underside of said data device when said data device is not in use.

9. The data device of claim 6, said mounting means further comprising at least one hinge for connecting said T-shaped member to said periphery of said frame, whereby said T-shaped member can be folded back along an underside of said data device when said data device is not in use.

10. A data device mountable on a steering wheel of a vehicle, comprising:
    a frame which includes a front portion and a rear portion; and
    mounting means disposed on said front portion of said frame for mounting said data device on the steering wheel of the vehicle;
    wherein said mounting means comprises at least two members connected to said front portion of said frame and extending forward from said data device, and a further member connected to forward ends of said at least two members and extending in a direction parallel to a width of said data device, said further member being of such a length as to have end portions which extend to the left and right, respectively, from said at least two members.

11. The data device of claim 10 in combination with the steering wheel, wherein said further member has a length large enough to pass through a center portion of the steering wheel, but small enough that the end portions of said further member contact a rear surface of a lower portion of the steering wheel once said data device is lowered into a rest position.

12. The data device of claim 11 in combination with the steering wheel, said mounting means further comprising hinges, one for each of said at least two members, for connecting said at least two members to said front portion of said frame, whereby said at least two members and said further member can be folded back along an underside of said data device when said data device is not in use.

13. The data device of claim 10, said mounting means further comprising hinges, one for each of said at least two members, for connecting said at least two members to said front portion of said frame, whereby said at least two members and said further member can be folded back along an underside of said data device when said data device is not in use.

14. The data device of claim 10, further comprising hinges for connecting said mounting means to said front portion of said frame, whereby said mounting means can be folded back along an underside of said data device when said data device is not in use.

15. A data device mountable on a steering wheel of a vehicle, comprising:

a frame which includes a front portion and a rear portion; and mounting means disposed on said front portion of said frame for mounting said data device on the steering wheel of the vehicle;

wherein said mounting means comprises a T-shaped member connected to said front portion of said frame and extending forward from said data device, said T-shaped member having a horizontal portion extending in a direction parallel to a width of said data device.

16. The data device of claim 15 in combination with the steering wheel, wherein said horizontal portion has a length large enough to pass through a center portion of the steering wheel, but small enough that ends of said horizontal portion contact a rear surface of a lower portion of the steering wheel once said data device is lowered into a rest position.

17. The data device of claim 16 in combination with the steering wheel, said mounting means further comprising at least one hinge for connecting said T-shaped member to said front portion of said frame, whereby said T-shaped member and said horizontal portion can be folded back along an underside of said data device when said data device is not in use.

18. The data device of claim 15, said mounting means further comprising at least one hinge for connecting said T-shaped member to said front portion of said frame, whereby said T-shaped member can be folded back along an underside of said data device when said data device is not in use.

* * * * *